United States Patent [19]

Adams

[11] 4,240,650
[45] Dec. 23, 1980

[54] LEAKING WELD REPAIR CLAMP

[76] Inventor: Harold R. Adams, St. Francisville, Ill. 62460

[21] Appl. No.: 910,132

[22] Filed: May 26, 1978

[51] Int. Cl.³ .................. F16L 17/04; F16L 55/16; F16L 55/18
[52] U.S. Cl. .................. 285/10; 285/15; 285/294; 285/363; 285/373; 138/99
[58] Field of Search ............ 285/10, 15, 171, 172, 285/294, 297, 363, 373; 138/97, 99

[56] References Cited

U.S. PATENT DOCUMENTS

| | | | |
|---|---|---|---|
| 344,760 | 6/1886 | Wilbur | 285/297 |
| 1,143,412 | 6/1915 | Loughridge | 285/297 X |
| 1,285,430 | 11/1918 | Sheppy | 285/10 X |
| 1,954,454 | 4/1934 | McFarland | 285/363 X |
| 3,153,550 | 10/1964 | Hollett | 285/373 X |
| 3,467,141 | 9/1969 | Smith | 285/94 X |
| 3,550,638 | 12/1970 | Smith | 285/15 X |
| 3,654,577 | 4/1972 | Spinner et al. | 285/297 X |
| 3,770,301 | 11/1973 | Adams | 285/15 |

FOREIGN PATENT DOCUMENTS 504168 4/1939 United Kingdom ............ 285/297

*Primary Examiner*—Roy D. Frazier
*Assistant Examiner*—Carl F. Pietruszka
*Attorney, Agent, or Firm*—Glenn K. Robbins

[57] ABSTRACT

A clamp assembly for sealing a leaking pipe weld or pipe flange joints. The clamp comprises a collar having hinged-together arcuate segments. The collar is further provided with flanges adapted to be bolted together to connect the hinged segments which may be hinged together to form a pair of semi-circular sections. Each of the segments is provided with a main annular groove on the interior circumference with means on the exterior for filling the groove with a fluid sealant under pressure. A pair of annular border grooves spaced from the main groove are provided on the opposite sides of the main groove. Additional groove means are provided in the end walls of each of the segments which connect the main groove and the border grooves to provide a sealing means between the opposed end walls when butted together.

3 Claims, 4 Drawing Figures

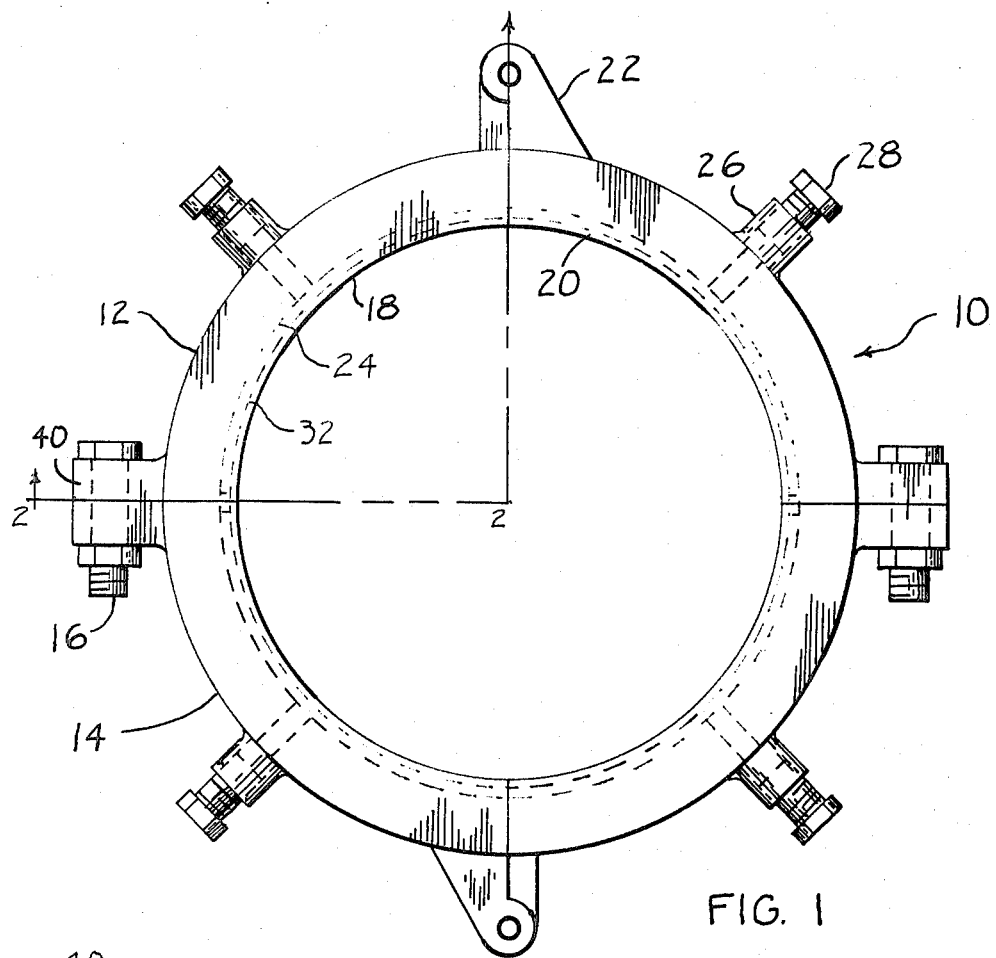
FIG. 1
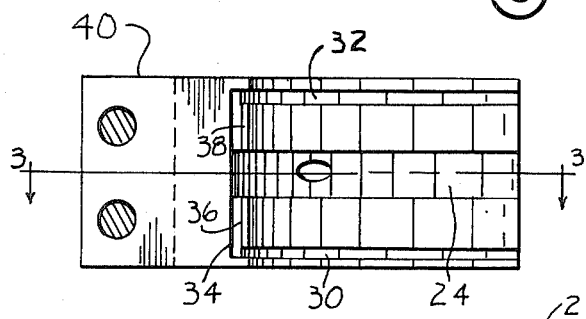
FIG. 2
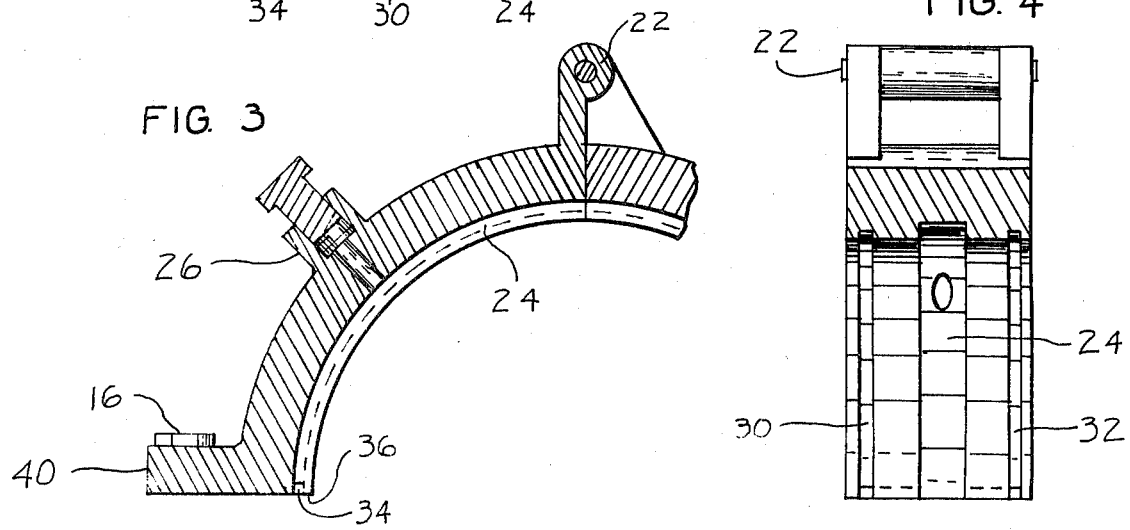
FIG. 3
FIG. 4

LEAKING WELD REPAIR CLAMP

BACKGROUND OF THE INVENTION

In the past there has been a problem to provide for repair in the field of pipe lines which have leaking welds or leaks between butted together pipe flanges. In various types of industrial installations and the petroleum industry as well as other areas large pipe lines are used which are under very high interior pressure. In such large pipe lines repair in the field is difficult because of the size and the pressures involved. Further inclement weather conditions and remote accessibility make the maintenance of such installations very difficult.

A device for repairing such leaks is shown in my U.S. Pat. No. 3,770,301. The instant invention provides an improved clamp having a wider and deeper main sealant groove and transverse grooves in the end faces. The latter grooves provide an improved sealant means between the end faces of the segmented clamp which butt together in the clamped relation. The butted together connection has been a troublesome source of leakage in the past.

By means of the instant invention there has been provided a hinged flange assembly which has superior means for sealing the butted ends of the segmented clamp sections which are adapted to be fitted around the pipe at the source of the leaking weld or at the flange joint between butted together flanges. Each of the segments which are of an arcuate nature to fit around the exterior of the pipe are provided with a central peripheral annular groove as well as border grooves spaced on either side of the main groove. A source of fluid sealant is provided through an exterior fitting adapted to be connected to a pressure gun or the like for pumping sealant to the main groove. The main groove is of a greater depth and width than the border grooves to provide a greater sealant source at the leaking weld source or butted together joint of the pipe flange.

The end walls of each of the segments are further provided with passage means which communicate the main groove with each of the opposite grooves. This is accomplished by a transverse groove which connects the main groove with the border grooves inside a lip. By this fashion the sealant has a passage way from the main groove to the border grooves at the end of each of the segment to seal the adjacent end faces of adjacent segments in the pipe clamping position.

The hinged clamp assembly of this invention is simple to employ in the field for repair of leaking welds or leaks between pipe flanges. Thus the service in the pipe need not be interrupted and the repair may be effected to continue this service for a prolonged period or where desired for replacement of the pipe sections involved.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for purpose of illustration only and that the invention is not limited thereto.

IN THE DRAWINGS

FIG. 1, is a view in front elevation of the clamp assembly;

FIG. 2, is a view in section taken on the line 2—2 of FIG. 1;

FIG. 3, is a view in section taken on the line 3—3 of FIG. 2; and

FIG. 4, is a view in side elevation in reduced scale taken from the right side of FIG. 3.

DESCRIPTION OF THE INVENTION

The flange clamp assembly of this invention is generally identified by the reference numeral 10 in the drawings. It is comprised of two semi-circular hinged sections 12 and 14 as shown in FIG. 1, which are adapted to be bolted together by conventional bolts 16. Each of the sections is comprised of a hinged segment 18 and 20 connected together by a hinge 22.

On the interior arcuate surface of each of the segments a main annular groove 24 is provided which extends from one end of the segment to an opposite end. On the exterior of each of the segments a nipple 26 is provided having a closure sealant line to pump sealant to the interior of the clamp while the bolt 28 is used for closure.

In addition to the main annular groove 24 border grooves 30 and 32 are provided on the interior of each of the clamp segments. These grooves are narrower and of a lesser depth than the main groove. Each of the border grooves 30 and 32 further extend from one end of the clamp segment to the other as best shown in FIG. 2.

In order to provide for communication of the sealant from the main annular groove to each of the border grooves and seal the butted together end faces of the segments a transverse passage way is provided at each butt end of the clamp segments. The transverse groove passage way is identified by the numeral 34 in FIG. 2. It will be seen that this groove communicates the main annular groove with each of the border grooves and is separated from the interior of the segment by lip 36 and 38. In this fashion the butt ends of the arcuate segments are sealed together when the clamp assembly is closed about the pipe.

For connection to each other, each of the semi-circular sections is provided with flanges 40. These flanges receive the bolt 16 for closure of the semi-circular sections around the leaking weld on the pipe or the butted sections of the pipe flanges as will be readily understood.

Use

In use each of the semi-circular sections 12 and 14 of the clamp assembly are simply placed over a leaking weld of the pipe involved. It will be understood that the clamp assembly is supplied with an internal diameter closely approximating that of the pipe to be repaired. It will be further understood that in this description the clamp assembly may be used on a leaking flange joint as well as a leaking weld.

In the placement of the two sections over the pipe the hinge 22 facilitates the opening of the segments in a jaw-like fashion and a subsequent closure to closely engage the exterior surface of the pipe. When the two sections have been closed about the pipe they are drawn tightly together by bolts 16 passed through the flanges 40 for each of the semi-circular sections.

Once the clamp is tightly connected to the pipe sealant is piped through the sealant fitting 26. This sealant will find a main passage through the main annular groove but due to irregularities in the exterior surface of the pipe some sealant will find its way to the border grooves by way of the inter-face between the exterior of the pipe and the interior of the clamp assembly. Further, additional sealant will flow to the ends of each segment through the main annular groove and will travel through the transverse passage 34 to each of the annular grooves on the border. Thus in this fashion the butt ends of each of the segments will be sealed to obviate leakage through the end faces in the butted relationship of each of the arcuate segments with relation to each other.

The sealant is a heavy viscous fluid as will be readily understood in the art and once the pumping has been completed to establish the sealant flow as described the fitting is closed by the closure bolt 28 to complete this sealing operation.

Various modifications and changes may be made withing this invention as will be readily apparent to those skilled in the art. Such changes and modifications are within the scope and teaching of this invention as defined by the claims appended hereto.

What is claimed is:

1. A clamp assembly for sealing a leaking weld and the circumferential joint between a pair of butted together pipe flanges, said clamp comprising a collar consisting of a plurality of arcuate segments adapted to be fitted around said pipe flanges, connecting means for connecting said segments around said flanges in butted relation at opposed ends of said segments, each of said segments having an inner circumferential wall provided with a main annular groove adapted to fit in registry with a joint between the pipe flanges, means for filling said groove with a fluid sealant under pressure comprising a fluid sealant filling communicating with said groove, said segments being further provided with a pair of annular border grooves on opposite sides of said main groove, and groove means in end walls of opposite segments connecting said main groove and said border grooves to provide a sealing means between said opposed end walls, said butted together segments having opposed radially extending butted together end walls provided with transverse grooves communicating the main groove with said border grooves, said main groove having a greater depth and width than said border grooves.

2. The clamp assembly of claim 1 in which a pair of arcuate segments are hinged together to comprise a semi-circular member adapted to be bolted in butted relation to another semi-circular member.

3. The clamp assembly of claim 1, in which the transverse grooves are spaced from an inner wall of said segment to provide a lip separating said transverse grooves from an inner surface of said segments.

* * * * *